United States Patent Office 2,945,657
Patented July 19, 1960

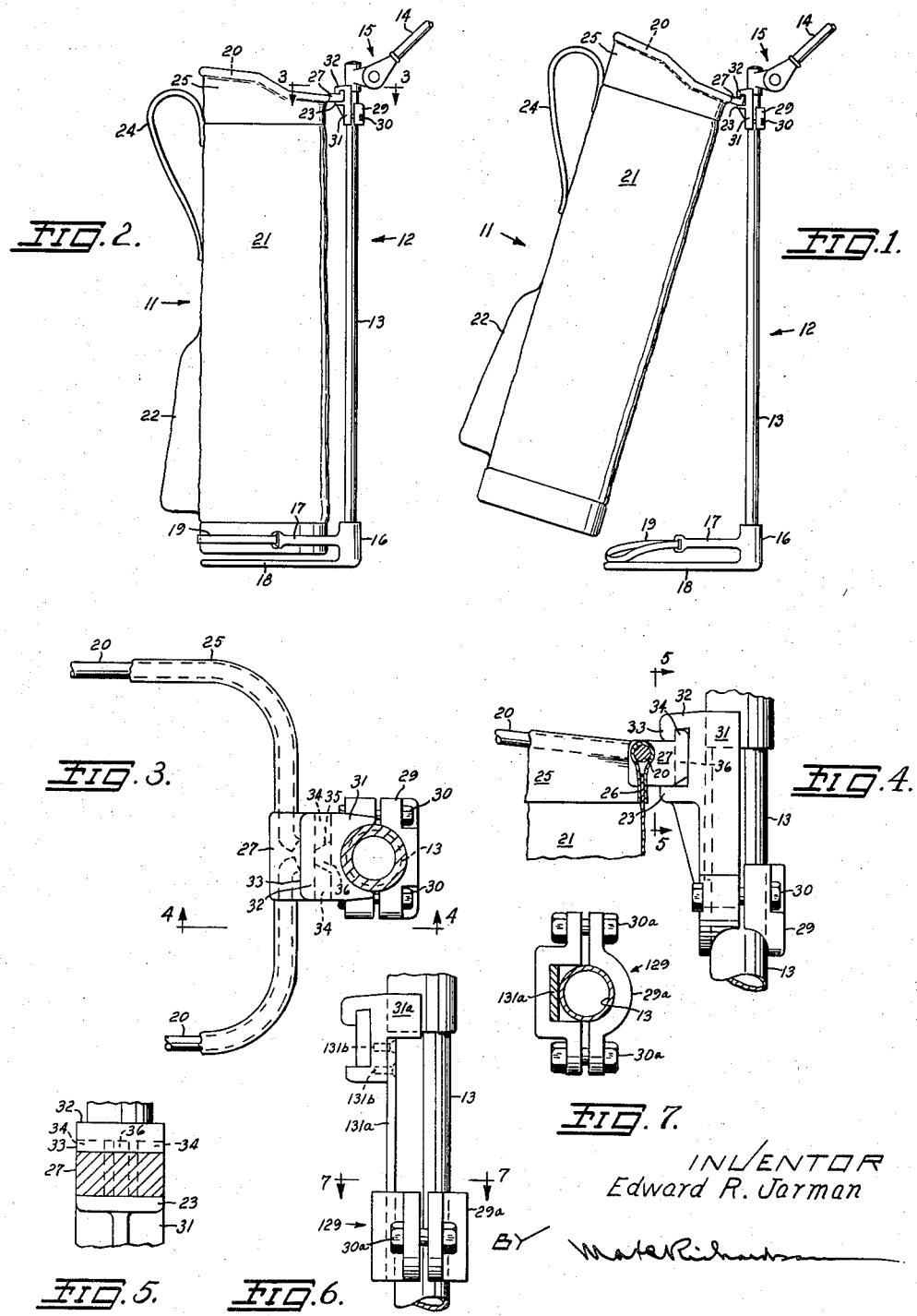

2,945,657

RESILIENT GOLF BAG SUPPORT

Edward R. Jarman, Portland, Oreg., assignor to Jarman-Williamson Company, Portland, Oreg., a partnership Filed Sept. 21, 1959, Ser. No. 841,240

3 Claims. (Cl. 248—96)

This invention is an improvement over the Golf Bag Support disclosed and claimed in my U.S. Pat. No. 2,854,244 issued Sept. 30, 1958.

It is a primary object of this invention to provide for the combination of a golf club supporting bag and a golf bag supporting cart means for resiliently supporting said bag with clubs on said cart and thereby making it unnecessary to provide means resiliently to support the frame of said cart on the wheels thereof.

It is a second object of this invention to provide a two part separable means for supporting a golf bag on a cart, one of said separable parts being secured to said bag and the other of said separable parts being secured to said cart and one or the other of said parts being resilient between its position of attachment to the other or the one of said parts and its position of securement to said bag or said cart.

It is a third object to provide an improved means for registering said two separable parts one with the other.

How these and other objects are attained is explained in the following description referring to the attached drawing in which Fig. 1 is a view in side elevation of part of a golf bag cart and a golf bag being secured thereto by one form of the two part means of this invention.

Fig. 2 is a view in side elevation of the cart and bag of Fig. 1 completely assembled together.

Fig. 3 is a fragmentary top plan sectional view along the line 3—3 of Fig. 2.

Fig. 4 is a fragmentary side elevation in partial section along the line 4—4 of Fig. 3.

Fig. 5 is a fragmentary front elevation in partial section along the line 5—5 of Fig. 4.

Fig. 6 is a fragmentary side elevation, like Fig. 4, of a section of the vertical tube frame of a golf cart with a resilient form of attachment part secured thereto.

Fig. 7 is a top plan sectional view along the line 7—7 of Fig. 6.

Like numerals of reference refer to like parts in the several figures of the drawing.

Referring now to the drawing in Fig. 1 is shown generally a golf bag 11 being attached in the manner of this invention to a golf cart indicated generally by the numeral 12. The cart 12, exposed as shown by the omission of the wheels and wheel mounting structure, is seen to comprise a commonly used type of longitudinal frame member 13 with a cart manipulating handle member 14 hingedly secured at 15 to the top of member 13, and a foot member 16 secured as shown to the bottom of basic member 13. Foot member 16 has a sufficient lateral spread between its sides 17 to receive bag 11 which in the prior art would have been supported on bottom grid 18 of foot member 16 and retained in position by strap 19 as shown in Fig. 2.

In the method here shown for the practice of my invention, bag 11 includes at its top a spring metal loop 20 of a form reguired to maintain a bag top opening of a desired shape. The bag sides 21 and pocket 22 are usually made of flexible fabric trimmed with leather of which also is made handle 24 and top finishing tunnel 25 secured to sides 21 at 26. Tunnel 25 encloses loop 20 as shown in Fig. 4.

Secured to loop 20 to become a permanent part thereof is bracket 27 extending through a cutaway opening in tunnel 25 as shown.

Longitudinally adjustably secured on frame member 13 by cap member 29 and screws 30 is bracket part 31 formed with a lower ledge 23 extending laterally normal to member 13 towards bracket 27 and a hook ledge 32 spaced upwardly from ledge 23 but generally parallel thereto. The outer end of ledge 32 extends downwardly towards ledge 23 to form a hook 33 adapted to engage a pair of laterally spaced hooks 34 extending upwardly along and above the face of bracket 27 away from bag 11. A prismoidal groove 35 is sunk into said face of bracket 27 between hooks 34 to receive a longitudinally extending prismoidal ridge 36 formed approximately parallel to member 13 along the vertical face of bracket 31 between ledges 23 and 32.

In the form here shown, loop 20 is formed of a one fourth inch diameter rust proofed spring steel rod. Loop 20 is rectangular in plan with parallel opposite sides and rounded corners. The kinked ends of the steel rod are placed in an aluminum casting die and melted aluminum cast therearound to form a permanent assembly of loop 20 and bracket 27. In Fig. 4 it is seen that loop 20 is positioned in bracket 27 as formed to tilt loop 20 slightly upward from normal to member 13 so that loop 20 will not appear to be weak as it flexes slightly downward when the weight of bag 11 and its contents are supported thereon. Also the bag 11 is deeper on its handle side, away from member 13, for better appearance since the longer wood clubs are held on this side of the bag.

When it is desired to place bag 11 in position for use with cart 12 the bag is placed as shown in Fig. 1 at an angle of engagement with respect to frame member 13, with the two laterally spaced hooks 34 of bracket 27 astride of ridge 36 of bracket 31 and hooked under hook ledge 33. In Fig. 4 it is seen that hooks 34 of bracket 27 have their outer top and bottom corners shortened to make it readily possible to hook hooks 34 under hooks 33 while supporting bracket 27 on ledge 23 of bracket 31 and then to rotate bag 11 downward about hook hinge 33—34 into its position of complete engagement with cart 12 as shown in Fig. 2. Strap 19 and sides 17 of foot member 16 then hold the bag in place as seen in Fig. 2 with the bag supported resiliently on loop 20 about one half inch above the bottom grid 18 of foot 16. Note in Figs. 3 and 4 that as the weight of the bag and its contents are supported on loop 20 the ends of loop 20 extending laterally from bracket 27 become torsion springs gently supporting the bag on the cart and thereby eliminating the need for resilient wheel supporting arms on the cart.

Another form of my invention is shown in Figs. 6 and 7 to eliminate the need of the torsion spring characteristic of loop 20 by using screws 131b to secure spring steel strap 131a to bracket 31a and then provide clamp 129 to receive the lower end of spring strap 131a. Screws 30a and cap member 29a are used to secure strap 131a onto frame member 13 and thus resiliently support bracket 31a on member 13. Bracket 31a, like bracket 31, will receive bracket 27 which will then resiliently support on frame member 13 anything supported on bracket 27.

It is seen that the first form of my invention as shown in Figs. 1 to 5 provides on bracket 27 a resilient support (loop 20) for the golf bag 11 while the second form shown in Figs. 6 and 7 provides a bracket 31a, 131a, with a resilient support on frame member 13 for bracket 31a, bracket 27 and bag 11.

It is seen that the primary and secondary objects of my invention are attained by either of disclosed forms, that of Figs. 1 to 5 or the variation thereof shown in Figs. 6, 7.

It is also seen that the third object of my invention is attained in the construction of bracket 27 on loop 20 together with either bracket 31, secured directly to cart frame member 13, or bracket 31a secured to frame member 13 by resilient steel strap 131a.

Having recited some of the objects of my invention, illustrated and described two forms in which my invention may be practiced and explained their modes of operation, I claim:

1. A two part separable means for resiliently suspending a golf club supporting bag on a cart for transporting said bag, one part of said separable means being secured to said bag and the other part to said cart, each of said parts including respective hook parts separably engageable one with the other and said one part including a resilient section secured to said bag for resiliently supporting said bag on the respective hook section of said one part.

2. A two part separable means for resiliently suspending a golf club supporting bag on a cart for transporting said bag, one part of said separable means being secured to said bag and the other to said cart, each of said parts including respective hook parts separably engageable one with the other and said other part including a resilient section secured to said cart for resiliently supporting the respective hook section of said other part on said cart.

3. The separable means of claim 1 in which said resilient section of said one part of said two part separable means includes a loop of resilient material secured into the opening of said bag to form said opening to a desired shape.

References Cited in the file of this patent

UNITED STATES PATENTS

| | | |
|---|---|---|
| 1,240,908 | Weis | Sept. 25, 1917 |
| 2,741,490 | Chamberlin | Apr. 10, 1956 |